United States Patent [19]

Helmer

[11] 3,710,643
[45] Jan. 16, 1973

[54] BRAKE BAND GUIDE STRUCTURE FOR BRAKE BANDS IN AUTOMATIC TRANSMISSION

[75] Inventor: Josef Helmer, Aich, Germany
[73] Assignee: Daimler-Benz Aktiengesellschaft, Germany
[22] Filed: Sept. 25, 1970
[21] Appl. No.: 75,412

[30] Foreign Application Priority Data

Sept. 27, 1969 Germany..................P 19 48 937.3

[52] U.S. Cl..................................74/606 R, 74/753
[51] Int. Cl..............................................F16h 57/10
[58] Field of Search...........74/606, 753; 188/335, 79

[56] References Cited

UNITED STATES PATENTS 1,281,704  10/1918  Taylor.....................................74/753
2,884,813  5/1959  Kelley.................................74/753 X Primary Examiner—Milton Kaufman
Assistant Examiner—F. D. Shoemaker
Attorney—Craig & Antonelli

[57] ABSTRACT

An interchangeable brake band guide structure for use in automatic transmission. Dovetail portions are arranged on the brake band guide structure for slidably engaging correspondingly shaped dovetail groove portions on the transmission housing. The guide structure is tapered in the longitudinal direction and includes axially spaced transverse walls extending in the direction of the brake bands for separating the brake bands from one another in the axial direction. The guide structure is preferably constructed of synthetic resinous material. The guide structure is precluded from sliding out of the dovetail groove by a projection on a transmission housing part which engages the wide end of the guide structure.

34 Claims, 6 Drawing Figures

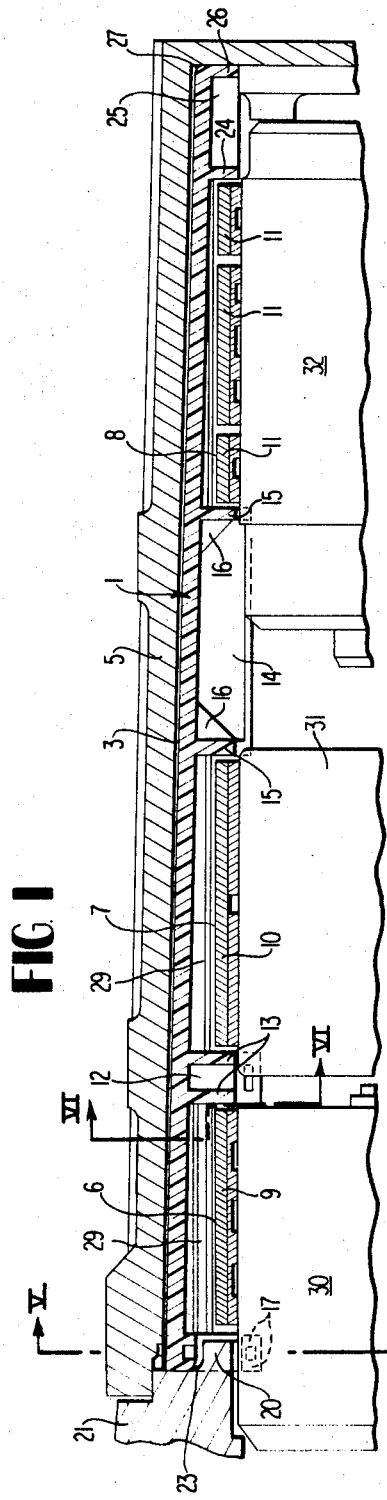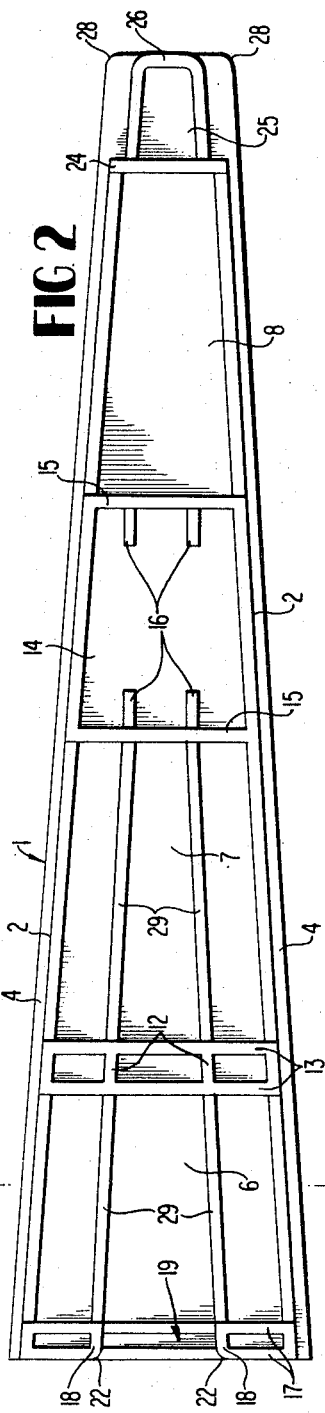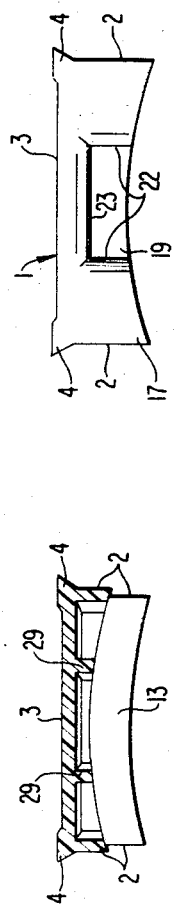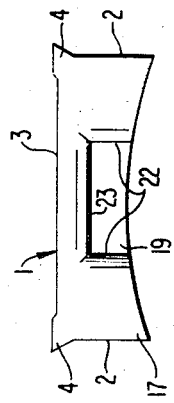

BRAKE BAND GUIDE STRUCTURE FOR BRAKE BANDS IN AUTOMATIC TRANSMISSION

The present invention relates to brake band guidances for guiding and positioning brake bands in automatic transmissions, especially for motor vehicles.

It is customary to assemble transmissions for engines of different horsepower ratings and for different transmission ratios in similar transmission housings. However, it is necessary for the differing requirements to be able to vary the width of the brake bands and therewith the form and shape of the brake band guidances. Since the customary brake band guidances used in the prior art are securely anchored in the transmission housings, it becomes necessary to store transmission housings in large number, which housings differ only by the brake band guidances matched to the modified widths of the brake bands. Also, due to the large number of housings necessarily stocked transmission housings are often mixed up during assembly of the transmissions.

The present invention is concerned with the task to create a uniform type of transmission housing. This is attained according to the present invention in that the brake band guidance is interchangeably secured in the transmission housing. One realizes thereby advantageously a decrease of the storage costs, and one avoids the possibility of a mix-up during the assembly.

In a preferred embodiment according to the present invention, the brake band guide means may be constructed as interchangeable by the arrangement of a dovetail guidance on the guide means for engaging a correspondingly shaped guidance on the transmission housing. By the use of such an arrangement, one may dispense with the presently customary manner of connecting the brake band guidances with the transmission housing by riveting or screws. Additionally, the assembly of the brake band guidance is facilitated and accelerated by the arrangement of the dovetail guidance in accordance with the present invention.

In order to further simplify the assembly, the brake band guide structure may be constructed wedge-shaped or tapered as seen in the direction of the transmission longitudinal axis.

A further feature of the present invention resides in the fact that the brake band guidance is made from a conventional synthetic resinous material. Strong wear of the presently customary brake band guidances made from metal is avoided by this synthetic resinous material construction. Furthermore, the use of a synthetic resinous material for the brake band guide structures, particularly regarding the described dovetail guidance, considerably simplifies the manufacture thereof.

For the purposes of securing the brake band guide structure in the dovetail guidance of the transmission housing it is proposed according to the present invention that the brake band guidance be secured against a sliding out of the dovetail guidance on the drive side of the transmission housing by an adjoining housing part provided with a projection.

Accordingly, it is an object of the present invention to provide a brake band guide structure for brake bands of automatic transmissions which avoids by simple means the aforementioned shortcomings and drawbacks encountered in the prior art.

Another object of the present invention resides in a brake band guide structure for brake bands of automatic transmissions, particularly for motor vehicles, which avoids the necessity of different types of transmission housing for the different brake band guidances of different engines and/or transmissions, and therewith avoids the danger of mix-up in the assembly of the transmissions within the housings.

A further object of the present invention resides in a brake band guide structure for the brake bands of automatic transmissions which considerably simplifies the storage problem of the housings, avoids improper assemblies and results in a decrease of the storage costs.

Still a further object of the present invention resides in a brake band guide means of the type described above which not only facilitates and speeds up the assembly thereof but also avoids the heretofore strong wear occurring in the brake band guide structures made presently from metal.

These and other objects, features and advantages of the present invention will become more obvious from the following description when taken in connection with the accompanying drawing which shows, for purposes of illustration only, one embodiment in accordance with the present invention, and wherein:

FIG. 1 is a partial longitudinal, axial cross-sectional view through a transmission housing with an installed brake band guide structure in accordance with the present invention together with the brake bands and the parts to be braked thereby;

FIG. 2 is a bottom plan view of the brake band guide structure according to FIG. 1;

FIG. 3 is a cross-sectional view of the brake band guide structure of FIG. 1, taken along line III—III of FIG. 2;

FIG. 4 is an end elevational view of the brake band guide structure according to FIG. 1;

Figure 5:
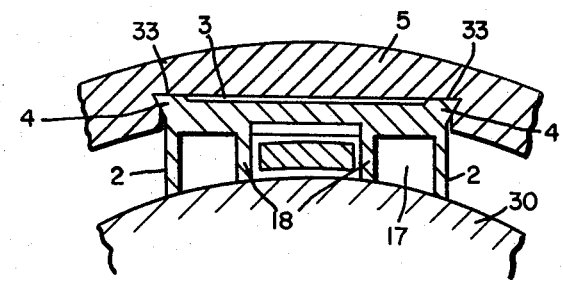
FIG. 5 is a cross-sectional view of the brake band guide structure taken along line V—V of FIG. 1.

Referring now to the drawing wherein like reference numerals are used throughout the various views to designate like parts, and more particularly to FIG. 1, a brake band guide structure generally designated in this figure by reference numeral 1 and essentially consisting of any suitable synthetic resinous material, is inserted into a transmission housing 5 by means of the dovetail guidance 4 that can be seen more clearly from FIGS. 2, 3 and 4. The brake band guide structure 1 is provided at the edges by the flanks 2 and the upper boundary surface 3. Three intermediate spaces 6, 7 and 8 for the guidance of the singly wrapped brake bands 9 and 10 and of a doubly wrapped brake band 11 are arranged at the bottom side of the brake band guide structure 1. These intermediate spaces are separated from one another by a double-walled web 13 open in the downward direction and reinforced by ribs 12 disposed parallel to the flanks 2 and by a box-shaped intermediate part 14 also open in the downward direction. The sidewalls 15 of the intermediate part 14 are braced by ribs 16 beveled off at an angle of 45°. The intermediate space 6 is delimited on the outside thereof also by a double-walled web 17 which, like the web 13, is provided with two reinforcing ribs 18. In contrast to the web 13, an aperture generally designated by reference numeral 19 is provided between the reinforcing ribs 18 of the double-walled web 17, into which engages an extension or projecting part 20 provided at an adjoining housing part 21, for example, at a clutch housing part, for fixing the brake band guide structure 1 in the dovetail guidance 4. For the purpose of facilitating the assembly, a lower outer edge 22 of the aperture 19 as well as the two edges 23 disposed perpendicular to the edge 20 are rounded off.

Figure 6:
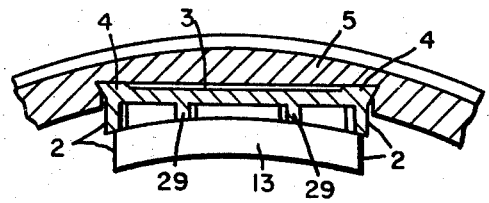
FIG. 6 is a cross-sectional view of the brake band guide structure taken along line VI—VI of FIG. 1.

FIGS. 5 and 6 further illustrate the dovetailed interconnection between the brake band guide structure and the transmission housing 5. Reference numeral 33 designates the dovetail opening in housing 5 which cooperates with dovetail guidance 4.

At the other end of the brake band guide structure 1, the intermediate space 8 is delimited in the outward direction by a web 24 and by a box-shaped part 25 adjoining the same and open in the downward direction. The dovetail guidance 4 extends within the area of the box-shaped part 25 over the entire height of the brake band guide structure 1. An edge 27 formed by a wall 26 closing off the part 25 at the end of the brake band guide structure 1 and by the upper boundary surface 3 as well as the two corners 28 formed by this edge 27 and the dovetail guidance 4 are rounded off for the purpose of easier assembly. Two reinforcing ribs 29 each, which are parallel to the flanks 2 are disposed within the intermediate spaces 6 and 7. The lower boundary surfaces of the flanks 2, of the webs 13, 17 and 24, of the intermediate part 14 as well as of the reinforcing ribs 29 are disposed—as can be seen from FIGS. 3 and 4—on outer surfaces of cylinders whose diameter is larger in each case by a slight amount than that of the associated brake bands 9, 10 and 11.

Additionally, the parts braked by the brake bands 9, 10 and 11 are indicated in FIG. 1, namely a planetary gear set 30, a clutch 31 and a planetary gear set 32 combined with a clutch.

While I have shown and described only one embodiment in accordance with the present invention, it is understood that the same is not limited thereto but is susceptible of numerous changes and modifications as known to those skilled in the art and I, therefore, do not wish to be limited to the details shown and described herein, but intend to cover all such changes and modifications as are encompassed by the scope of the present invention.

What I claim is:

1. A brake band guide structure for use in automatic transmissions of the type having a longitudinally extending housing and a plurality of brake bands axially spaced from one another in said housing along the longitudinal axis of said housing for selective braking engagement with respective radially outwardly facing surfaces of rotating parts of the transmission; said brake band guide structure comprising mounting means for interchangeably mounting said brake band guide structure in said transmission and guiding means for guiding said brake bands in position in said housing.

2. A brake band guide structure according to claim 1, wherein the mounting means includes dovetail means arranged on said brake band guide structure for engagement with corresponding dovetail means on said transmission.

3. A brake band guide structure according to claim 2, characterized in that the brake and guide structure is tapered in the direction of the longitudinal axis of said housing.

4. A brake band guide structure according to claim 3, characterized in that the brake band guide structure essentially consists of synthetic resinous material.

5. A brake band guide structure according to claim 4, characterized in that the mounting means further includes an adjoining housing part of the transmission which is provided with a projection for securing the brake band guide structure against sliding out of the dovetail means, said projection being arranged at the widest end of said brake band guide structure, which widest end corresponds to the drive side of the transmission housing.

6. A brake band guide structure according to claim 5, characterized in that said brake band guide structure includes transversely extending wall means on the side of said brake band guide structure facing the brake bands, said wall means delimiting the ends of a plurality of axially spaced intermediate spaces within which spaces respective brake bands are guided.

7. A brake band structure according to claim 6, characterized in that at least some of said transversely extending wall means are of double-walled construction to form web portions open in the direction facing the brake bands.

8. A brake band guide structure according to claim 7, characterized in that said brake band guide structure includes generally longitudinally extending flank portions projecting from a main surface portion toward the brake bands.

9. A brake band guide structure according to claim 8, characterized in that said main surface portion has a substantially flat surface and in that the dovetailed means adjoin said flat surface.

10. A brake band guide structure according to claim 9, characterized in that said web portions are reinforced by rib means extending approximately parallel to the flank portions.

11. A brake band guide structure according to claim 10, characterized in that the brake band guide structure is provided at one end with a double-walled web portion having an aperture in the center area thereof to receive the projection from the adjoining housing part to fix the brake band guide structure against slipping out.

12. A brake band guide structure according to claim 11, characterized in that two of the intermediate spaces are separated from one another by a box-shaped intermediate part open in the direction facing the brake bands, the end walls of said box-shaped intermediate part being formed by two of said transversely extending wall means.

13. A brake band guide structure according to claim 12, characterized in that the two end walls of said intermediate part are reinforced by rib means beveled off at an angle.

14. A brake band guide structure according to claim 13, characterized in that the end of said brake band guide structure opposite said projection is provided with a transversely extending wall means delimiting in the axial direction the adjoining intermediate space, said last mentioned wall means being adjoined by a box-shaped part open in the direction facing the longitudinal axis of the housing.

15. A brake band guide structure according to claim 14, characterized in that at least some of the surfaces of the transversely extending wall means at the ends of the brake band guide structure are rounded off to facilitate assembly.

16. A brake band guide structure according to claim 1, characterized in that the brake band guide structure is tapered in the direction of the longitudinal axis of said housing.

17. A brake band guide structure according to claim 1, characterized in that the brake band guide structure essentially consists of synthetic resinous material.

18. A brake band guide structure according to claim 1, characterized in that the mounting means further includes an adjoining housing part of the transmission which is provided with a projection for securing the brake band guide structure against sliding out of the dovetail means, said projection being arranged at the widest end of said brake band guide structure, which widest end corresponds to the drive side of the transmission housing.

19. A brake band guide structure according to claim 1, characterized in that said brake band guide structure includes transversely extending wall means on the side of said brake band guide structure facing the brake bands, said wall means delimiting the ends of a plurality of axially spaced intermediate spaces within which spaces respective brake bands are guided.

20. A brake band structure according to claim 19, characterized in that at least some of said transversely extending wall means are of double-walled construction to form web portions in the direction facing the brake bands.

21. A brake band guide structure according to claim 1, characterized in that said brake band guide structure includes generally longitudinally extending flank portions projecting from a main surface portion toward the brake bands.

22. A brake band guide structure according to claim 21, characterized in that said main surface portion has a substantially flat surface and in that the guide means adjoin said flat surface.

23. A brake band guide structure according to claim 20, characterized in that said web portions are reinforced by rib means extending approximately parrallel to the flank portions.

24. A brake band guide structure according to claim 1, characterized in that the brake band guide structure is provided at one end with a double-walled web portion having an aperture in the center area thereof to receive a projection from the adjoining housing part to fix the brake band guide structure against slipping out.

25. A brake band guide structure according to claim 19, characterized in that two of the intermediate spaces are separated from one another by a box-shaped intermediate part open in the direction facing the brake bands, the end walls of said box-shaped intermediate part being formed by two of said transversely extending wall means.

26. A brake band guide structure according to claim 25, characterized in that the two end walls of said intermediate part are reinforced by rib means beveled off at an angle.

27. A brake band guide structure according to claim 24, characterized in that the end of said brake band guide structure opposite said projection is provided with a transversely extending wall means delimiting in the axial direction the adjoining intermediate space, said last mentioned wall means being adjoined by a box-shaped part open in the direction facing the longitudinal axis of the housing.

28. A brake band guide structure according to claim 19, characterized in that at least some of the surfaces of the transversely extending wall means at the ends of the brake band guide structure are rounded off to facilitate assembly.

29. A brake band guide structure according to claim 1, wherein said mounting means includes interengageable surfaces arranged on said brake band guide structure for engagement with corresponding inter-engageable surfaces on said transmission housing.

30. A brake band guide structure according to claim 29, wherein said mounting means further includes a projection connected to said housing, which projection engages said brake band guide structure to prevent relative sliding of said interengageable surfaces on said brake band guide structure and said transmission housing.

31. A brake band guide structure according to claim 30, wherein said projection is arranged to directly engage an end face of said brake band guide structure.

32. A brake band guide structure for use in automatic transmission of the type having a longitudinally extending housing and at least one brake band arranged in said housing for selective braking engagement with a radially outwardly facing surface of a rotating part of the transmission; said brake band guide structure comprising mounting means for interchangeably mounting said brake band guide structure in said transmission housing and guiding means for guiding said brake bands in position in said housing, wherein said mounting means includes interengageable sliding surfaces arranged on said brake band guide structure for sliding engagement with corresponding interengageable surfaces on said transmission housing.

33. A brake band guide structure according to claim 32, wherein said mounting means further includes a projection connected to said housing, which projection engages said brake band guide structure to prevent relative sliding of said interengageable surfaces on said brake band guide structure and said transmission housing.

34. A brake band guide structure according to claim 32, wherein said sliding surfaces are so positioned that the brake band guide structure is longitudinally slidable in said housing for mounting engagement of said surfaces.

* * * * *